United States Patent
Liu et al.

(10) Patent No.: US 7,650,031 B2
(45) Date of Patent: Jan. 19, 2010

(54) METHOD AND SYSTEM FOR DETECTING BLACK FRAMES IN A SEQUENCE OF FRAMES

(75) Inventors: Tie-Yan Liu, Beijing (CN); Bo Feng, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 10/997,071

(22) Filed: Nov. 23, 2004

(65) Prior Publication Data

US 2006/0110057 A1    May 25, 2006

(51) Int. Cl.
G06K 9/46    (2006.01)
G06K 9/66    (2006.01)
G06K 9/00    (2006.01)
G06K 9/34    (2006.01)
G06K 9/36    (2006.01)
H04N 7/12    (2006.01)
H04H 60/32   (2008.01)

(52) U.S. Cl. .............. 382/165; 382/190; 382/233; 382/239; 382/235; 725/19; 375/240.27; 375/240.28

(58) Field of Classification Search ........... 382/165, 382/190, 233, 235, 239; 725/19; 340/240.27, 340/240.28
See application file for complete search history.

(56) References Cited

U.S. PATENT DOCUMENTS

| 5,129,011 A | * | 7/1992 | Nishikawa et al. | 382/173 |
|---|---|---|---|---|
| 5,533,138 A | * | 7/1996 | Kim et al. | 382/232 |
| 5,835,165 A | * | 11/1998 | Keate et al. | 375/240.27 |
| 5,959,703 A | * | 9/1999 | Oh et al. | 375/240.27 |
| 5,974,172 A | * | 10/1999 | Chen | 382/166 |
| 6,021,221 A | * | 2/2000 | Takaha | 382/199 |
| 6,122,318 A | * | 9/2000 | Yamaguchi et al. | 375/240 |
| 6,317,461 B1 | * | 11/2001 | Chujoh et al. | 375/240.23 |
| 6,381,364 B1 | * | 4/2002 | Gardos | 382/173 |
| 6,408,098 B2 | * | 6/2002 | Nagai et al. | 382/232 |
| 6,516,034 B2 | * | 2/2003 | Todo et al. | 375/240.25 |
| 6,570,926 B1 | * | 5/2003 | Agrawal et al. | 375/240.27 |
| 6,625,323 B2 | * | 9/2003 | Henderson et al. | 382/251 |

(Continued)

OTHER PUBLICATIONS

Favalli et al. "Object Tracking for Retrieval Applications in MPEG-2", IEEE Transactions on Circuits and Systems for Video Technology, vol. 10, No. 3, April 200, pp. 427-432.*

(Continued)

Primary Examiner—Andrew W Johns
Assistant Examiner—Mia M Thomas
(74) Attorney, Agent, or Firm—Perkins Coie LLP

(57) ABSTRACT

Methods and systems for identifying black frames within a sequence of frames are provided. In one embodiment, the detection system detects black frames within a sequence of frames by fully decoding base frames and then partially decoding non-black, non-base frames in a way that ensures the blackness of each frame can be determined. The detection system decodes base frames before decoding dependent frames, which is referred to as processing frames in reverse order of dependency since a frame is processed before the frames that depend on it are processed. In another embodiment, the detection system determines the blackness of frames within a sequence of frames by processing the frames in order of their dependency and following chains of block dependency to decode and determine the blackness of blocks.

29 Claims, 10 Drawing Sheets

U.S. PATENT DOCUMENTS

| | | | |
|---|---|---|---|
| 6,721,361 B1 * | 4/2004 | Covell et al. | 375/240.14 |
| 6,724,944 B1 * | 4/2004 | Kalevo et al. | 382/268 |
| 6,744,922 B1 * | 6/2004 | Walker | 382/190 |
| 6,829,299 B1 * | 12/2004 | Chujoh et al. | 375/240 |
| 6,928,233 B1 * | 8/2005 | Walker et al. | 386/69 |
| 6,993,245 B1 * | 1/2006 | Harville | 386/46 |
| 7,039,117 B2 * | 5/2006 | Chan | 375/240.27 |
| 7,058,223 B2 * | 6/2006 | Cox | 382/190 |
| 7,072,512 B2 * | 7/2006 | Mehrotra | 382/173 |
| 7,136,416 B2 * | 11/2006 | Chujoh et al. | 375/240.27 |
| 7,184,600 B2 * | 2/2007 | Yamaguchi et al. | 382/233 |
| 7,203,239 B2 * | 4/2007 | Chujoh et al. | 375/240.23 |
| 7,215,712 B2 * | 5/2007 | Katsavounidis et al. | 375/240.28 |
| 7,236,530 B2 * | 6/2007 | Chujoh et al. | 375/240.23 |
| 7,260,150 B2 * | 8/2007 | Katsavounidis et al. | 375/240.28 |
| 7,327,789 B2 * | 2/2008 | Horiike et al. | 375/240.25 |
| 7,327,885 B2 * | 2/2008 | Divakaran et al. | 382/190 |
| 7,336,890 B2 * | 2/2008 | Lu et al. | 386/96 |
| 7,590,204 B2 * | 9/2009 | Monsen | 375/350 |
| 2001/0021267 A1 * | 9/2001 | Jun et al. | 382/165 |
| 2002/0032698 A1 * | 3/2002 | Cox | 707/501.1 |
| 2002/0118950 A1 * | 8/2002 | Molinet, III | 386/68 |
| 2002/0186768 A1 * | 12/2002 | Dimitrova et al. | 375/240.12 |
| 2003/0142752 A1 * | 7/2003 | Demas et al. | 375/240.27 |
| 2003/0165273 A1 * | 9/2003 | Berkner et al. | 382/240 |
| 2004/0017852 A1 * | 1/2004 | Garrido et al. | 375/240.16 |
| 2004/0017853 A1 * | 1/2004 | Garrido et al. | 375/240.16 |
| 2004/0071352 A1 * | 4/2004 | Mizoguchi et al. | 382/233 |
| 2004/0268380 A1 * | 12/2004 | Divakaran et al. | 725/19 |
| 2006/0107289 A1 * | 5/2006 | DeYonker et al. | 725/37 |
| 2007/0041667 A1 * | 2/2007 | Cox | 382/305 |
| 2008/0285854 A1 * | 11/2008 | Kotake et al. | 382/190 |

OTHER PUBLICATIONS

MPEG-2 White Paper, Pinnacle Technical Documentation, Pinnacle Systems, Feb. 29, 2000 (21 pages).

* cited by examiner

METHOD AND SYSTEM FOR DETECTING BLACK FRAMES IN A SEQUENCE OF FRAMES

TECHNICAL FIELD

The described technology relates generally to detecting black frames within a sequence of frames such as an MPEG-2 encoding of frames.

BACKGROUND

Many techniques have been proposed for detecting commercials within television broadcasts. The accurate detection of commercials in a television broadcast is particularly important because it provides high-level program segmentation that other algorithms can use when processing program content. For example, after the commercials are detected in a previously recorded broadcast, the commercials can be skipped when replaying the recorded broadcast. One technique for detecting commercials generates signatures representing the audio of known commercials and then compares those signatures to the audio of a television broadcast. This technique, however, requires that the commercials be known in advance. Another technique is based in part on the detection of black frames that are used as separators between commercials and programs. The presence of black frames, especially when combined with other features of a broadcast, can be used effectively to identify commercial scenes within a broadcast. These other features may include rate of scene changes, edge change ratios, motion vector length, frame luminance, letterbox and key frame distances, and so on.

Many of the proposed techniques for detecting commercials, however, are computationally expensive and thus cannot be performed in real time with standard television equipment, such as a set-top box or standard personal computer. A standard MPEG-2 video decoder typically requires a 1 GHz processor to fully decode a video stream. A standard set-top box may only have a low-cost central processing unit that may be a 0.1 GHZ processor. With only 10% of the power needed to fully decode a video stream, such a standard set-top box cannot even fully decode an entire video stream in real time, let alone detect black frames after decoding fast enough to perform some action in real time relating to black frames.

It would be desirable to have a technique for reliably detecting black frames in a video stream in real time so that some action can be performed relating to the black frames.

SUMMARY

Methods and systems for identifying black frames within a sequence of frames are provided. The detection system detects black frames within a sequence of frames by fully decoding base frames and then partially decoding non-black, non-base frames in a way that ensures the blackness of each frame can be determined. A base frame is a frame that at least one other frame depends on for its decoding. The detection system decodes base frames before decoding dependent frames, which is referred to as processing frames in reverse order of dependency since a frame is processed before the frames that depend on it are processed. For each base frame, the detection system decodes the base frame and determines the blackness of the blocks of the decoded base frame. When a decoded block is determined to be non-black, the detection system indicates that the base frame is non-black. When no decoded block is determined to be non-black, the detection system indicates that the base frame is black. After the base frames are decoded, the detection system decodes the non-base frames. The detection system decodes a block of a non-base frame and then determines the blackness of that decoded block. If the decoded block is determined to be non-black, then the detection system indicates that the non-base frame is non-black and suppresses the decoding of other blocks of the non-base frame. When no decoded block of the non-base frame is determined to be non-black, the detection system indicates that the non-base frame is black.

The detection system may alternatively determine the blackness of frames within a sequence of frames by processing the frames in order of their dependency. To detect black frames, the detection system starts with the non-base frames. When processing blocks in order of their dependency, the detection system starts decoding the blocks of a frame until a block that is non-black is decoded. When a non-black block is decoded, the detection system stops decoding the blocks of that frame and indicates that the frame is non-black. If after all the blocks of the frame are decoded and no non-black frame has been detected, the detection system indicates that the frame is black. When decoding a dependent block, the detection system decodes each block upon which that block depends directly or indirectly and determines its blackness. If a depended-upon block is determined to be non-black, then the detection system sets the frame of each depended-upon block to non-black so that the detection system can skip over blocks and frames whose blackness has already been determined when decoding a dependent block.

DETAILED DESCRIPTION

Figure 1:
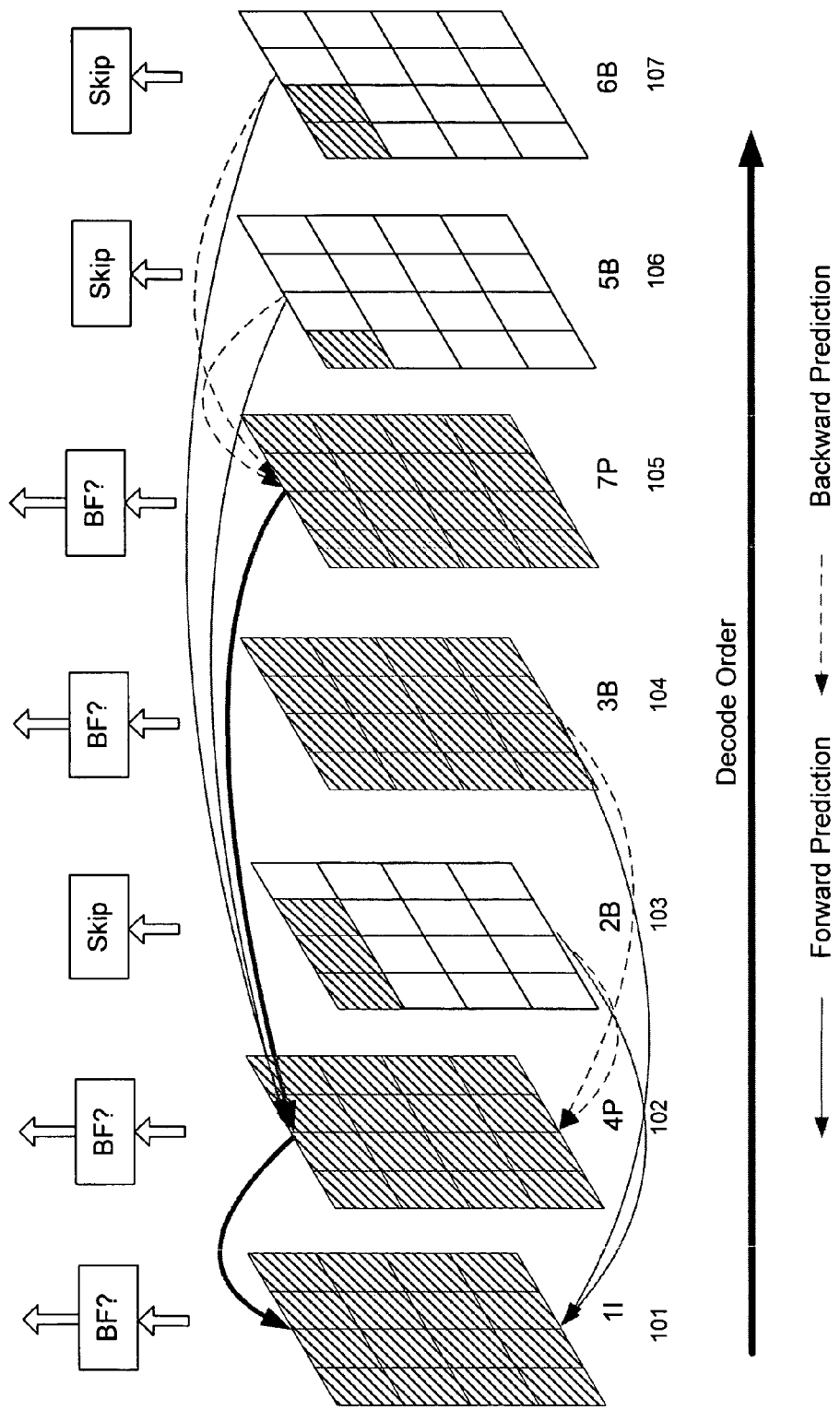
FIG. 1 is a block diagram that illustrates the identification of black frames by processing the frames in reverse order of dependency.

Methods and systems for identifying black frames within a sequence of frames are provided. In one embodiment, the detection system detects black frames within a sequence of frames by fully decoding base frames and then partially decoding non-black, non-base frames in a way that ensures that the blackness of each frame can be determined. A base frame is a frame that at least one other frame depends on for its decoding. For example, in MPEG-2 decoding, the I-frames and the P-frames are base frames and the B-frames are non-base frames. An I-frame is encoded based on intra-frame references, and a P-frame is encoded based on references to an I-frame and/or other P-frames. A B-frame is encoded based on forward or backward references to an I-frame or P-frames. Thus, the encoding of B-frames and P-frames depends on the encoding of I-frames and/or P-frames. Since the encoding of no frame depends on the encoding of B-frames, B-frames are non-base frames. Conversely, since the encoding of B-frames depends on the encoding of I-frames and P-frames, I-frames and P-frames are base frames. In this embodiment, the detection system decodes base frames before decoding their dependent frames, which is referred to as processing frames in reverse order of dependency since a frame is processed before the frames that depend on it are processed. For each base frame, the detection system decodes the base frame and determines the blackness of the blocks (e.g., "macroblocks" in MPEG-2 terminology) of the decoded base frame. When a decoded block is determined to be non-black, the detection system indicates that the base frame is non-black. When no decoded block is determined to be non-black, the detection system indicates that the base frame is black. After a base frame is decoded, the detection system decodes the frames that depend on it. The detection system decodes a block of a non-base frame and then determines the blackness of that decoded block. If the decoded block is determined to be non-black, then the detection system indicates that the non-base frame is non-black and suppresses the decoding of other blocks of the non-base frame. When no decoded block of the non-base frame is determined to be non-black, the detection system indicates that the non-base frame is black. The detection system may decode the blocks of a non-base frame starting with a block in the upper left corner of the frame and ending with a block in the lower right corner of the frame. In this way, the detection system can identify black frames within a sequence of frames without having to fully decode each frame. In particular, the detection system only needs to fully decode I-frames, P-frames, black B-frames, and about 10% of the non-black B-frames to identify the black frames. Since most of the frames in a sequence of frames may be non-black B-frames, significant efficiencies may be realized by not having to fully decode the non-black B-frames. Moreover, the detection system need only determine the blackness of the blocks of a frame until a block is determined to be non-black. In such a case, the detection system sets the frame to non-black and does not need to determine the blackness of any more blocks of the frame.

In an alternate embodiment, the detection system determines the blackness of frames of a sequence of frames by processing the frames in order of their dependency. That is, frames that depend on other frames are processed before the frames on which they depend are processed. The order of dependency for MPEG-2 encoding is that B-frames depend on I-frames and P-frames, and P-frames depend on I-frames and other P-frames. Thus, the order of dependency is B-frames followed by P-frames followed by I-frames. In MPEG-2 encoding, a sequence of frames is organized into a group of pictures ("GOP") data structure. A GOP data structure begins with an I-frame and ends with a B-frame with the intermediate frames being P-frames and B-frames. To detect black frames within a GOP sequence, the detection system starts by decoding the blocks of the last B-frames in the GOP data structure. (The detection system can actually start with any B-frame in a GOP as long as the frames are processed in order of their dependency.) The blocks of a B-frame may be independent or dependent. An independent block encodes the values of its pixels without reference to another block. A dependent block encodes the values of its pixels with reference to another block. In the case of B-frames, their dependent blocks are encoded with reference to blocks of an I-frame or a P-frame. In the case of P-frames, their dependent blocks are encoded with reference to blocks of an I-frame or another P-frame. In the case of I-frames, their dependent blocks are encoded with reference to other blocks of that same I-frame.

When processing blocks in order of their dependency, the detection system decodes the blocks of a frame until a block that is non-black is decoded. When a non-black block is decoded, the detection system stops decoding the blocks of that frame and indicates that the frame is non-black. If after all the blocks of the frame are decoded and no non-black frame has been detected, the detection system indicates that the frame is black. When decoding a dependent block, the detection system needs to decode each block upon which that block depends directly or indirectly. In the case of a block of a B-frame, it may depend on a block of a P-frame (which may depend upon a block of an I-frame or another P-frame) or an I-frame (which may depend upon another block of the I-frame). Thus, a dependent block specifies a chain of one or more dependency (i.e., references to other blocks) to blocks that end with an independent block. When decoding a block, the detection system follows the chain of dependency of the dependent blocks to the final block in the chain, which is an independent block. The detection system can then determine the blackness of each block in the chain of blocks and mark the blocks as having been decoded. If a block in the chain is determined to be non-black, then the detection system sets the frame of that block to non-black. When the detection system subsequently starts to process a frame that has already been marked as non-black when processing a chain of dependent blocks, the detection system skips the processing of that frame. Similarly, when the detection system selects a block of a frame to be decoded and that block has already been decoded when processing a chain of dependent blocks, the detection system skips the decoding of that block and uses the already established blackness of that block. In this way, the detection system can greatly reduce the number of blocks that need to be decoded when determining the blackness of the frames within a sequence of frames.

FIG. 1 is a block diagram that illustrates the identification of black frames by processing the frames in reverse order of dependency. The frames 101-107 are processed in reverse order of dependency by processing I-frame 101 before P-frame 102, which is processed before P-frame 105. After the detection system processes P-frame 102, it can process frames 103-105 in any order because none of those frames are dependent on each other. After the detection system processes P-frame 105, it can process B-frames 106-107 in any order because they do not depend on each other. When processing I-frames and P-frames, the detection system decodes each block of the frame because those blocks may be base blocks on which other blocks depend. The detection system, however, need only calculate the blackness of the blocks of a frame until a non-black block is detected. When a non-black block is detected, the detection system sets the blackness of that frame to non-black. If no non-black blocks are detected, then the detection system sets the blackness of that frame to black. When processing B-frames, the detection system need only decode and determine the blackness of blocks until a non-black block is detected. In such a case, the detection system indicates that the frame is non-black and skips to processing the next frame. If a B-frame is black, then the detection system decodes each block of the frame. In FIG. 1, the number followed by the letter under each frame indicates the position of the frame in the sequence of frames and its frame type. For example, "4P" under frame 102 indicates it is the fourth frame within the sequence (although it is second in the reverse order of dependency) and is a P-frame.

Figure 2:
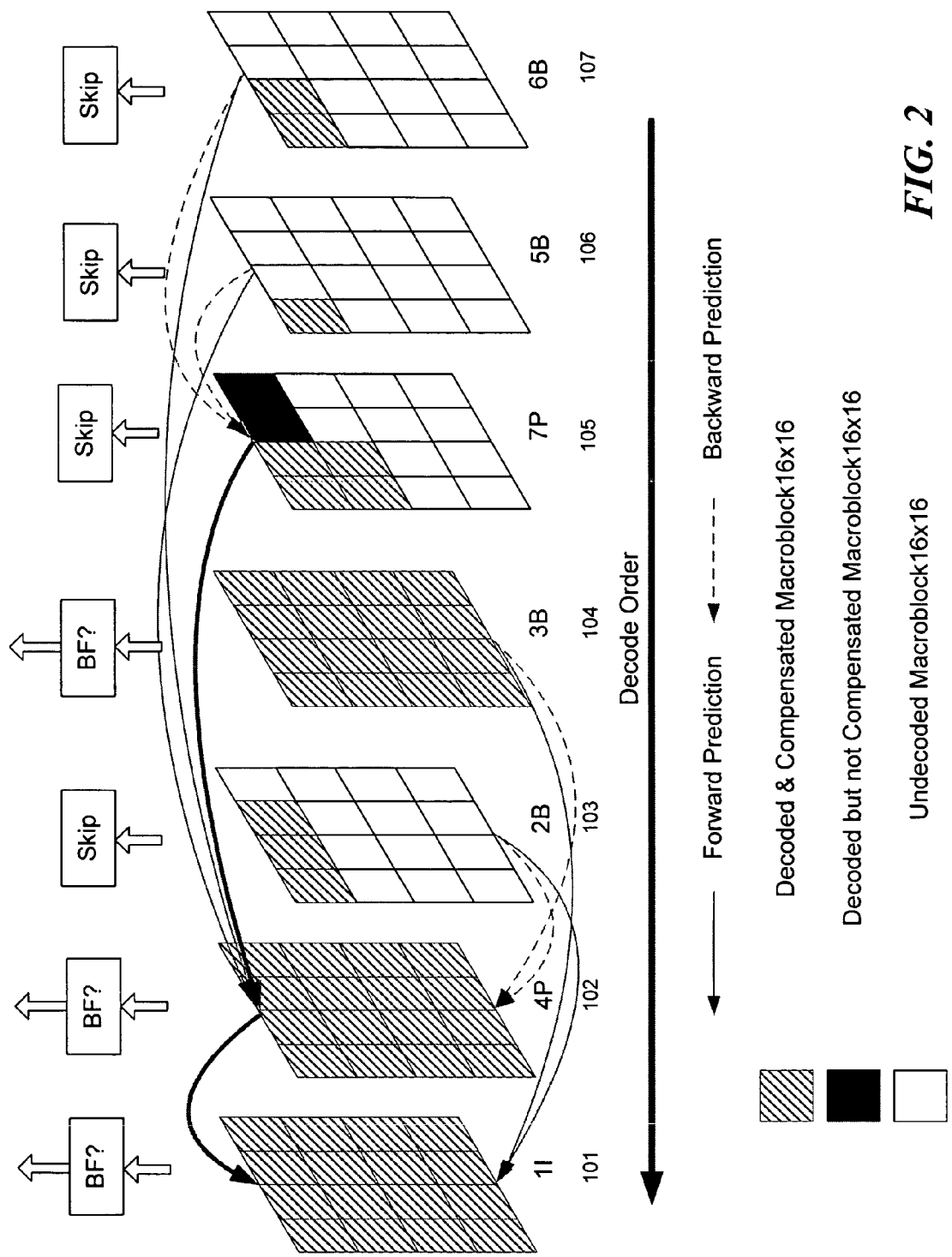
FIG. 2 is a block diagram that illustrates the identification of black frames by processing the frames in order of dependency.

FIG. 2 is a block diagram that illustrates the identification of black frames by processing the frames in order of dependency. The frames 101-107 are processed in order of dependency by processing B-frames 106 and 107 before processing P-frame 105, by processing B-frames 103 and 104 and P-frame 105 before processing P-frame 102, and by processing P-frames 102 and 105 before processing I-frame 101. When processing a block of a frame, if that block depends on another block, then the detection system follows the chain of dependent blocks until an independent block is encountered. For example, a block of B-frame 106 may depend on a block of P-frame 105, which may depend on a block of P-frame 102, which may depend on a block of I-frame 101, which may depend on another block of I-frame 101, which may be an independent block and thus the last block in the chain. After the detection system locates the last block in the chain of blocks, the detection system sets the blackness of each block in the chain. When a block in the chain is non-black, then the detection system indicates that its frame is non-black so that the detection system can skip that frame when it is processed in the order of its dependency. Also, the detection system can skip the decoding of blocks that are in a chain of blocks that were previously decoded.

Figure 3:
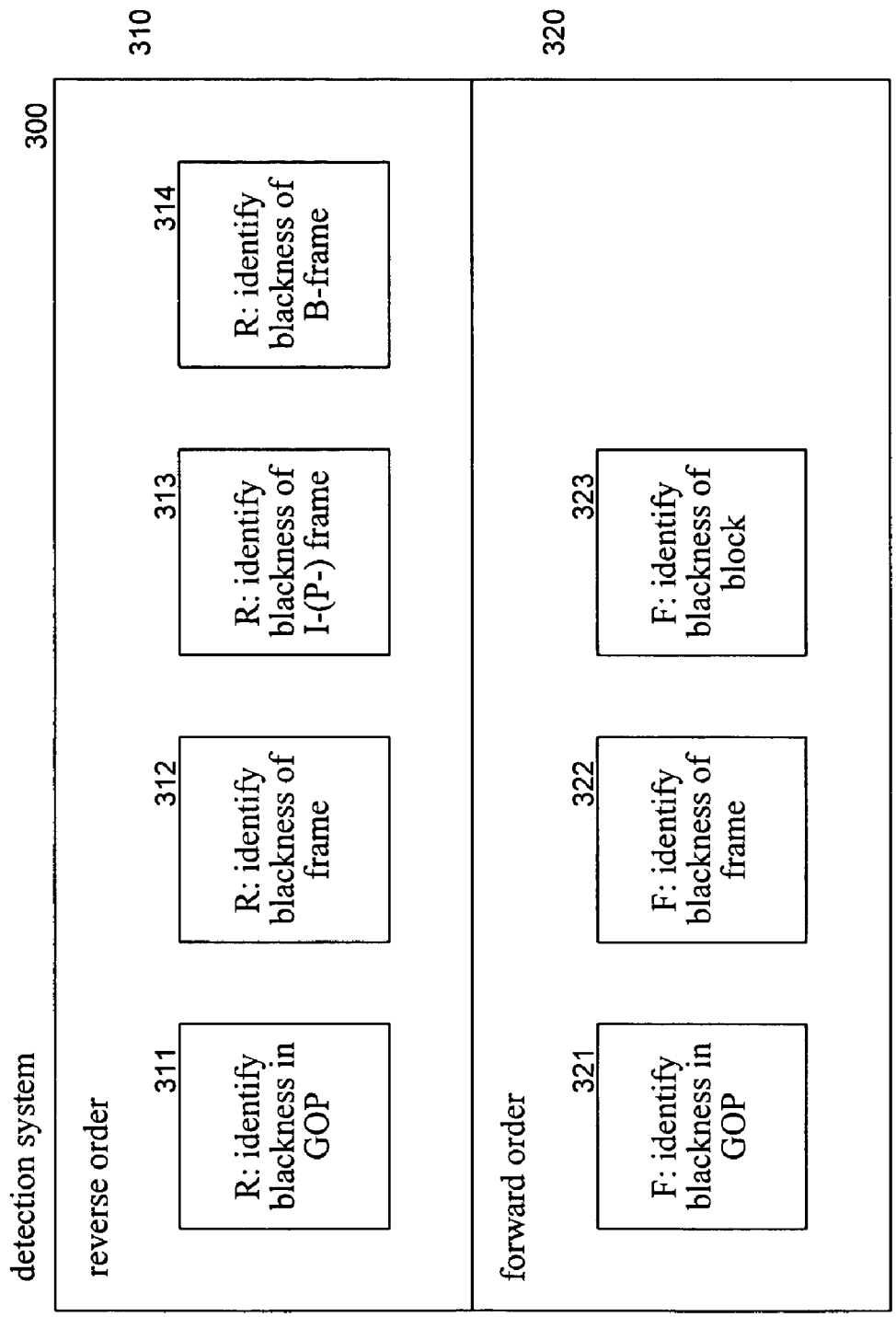
FIG. 3 is a block diagram that illustrates components of the detection system in one embodiment.

FIG. 3 is a block diagram that illustrates components of the detection system in one embodiment. The detection system 300 may have a reverse order of dependency mode 310 and a forward order of dependency mode 320. The detection system may be implemented with only one of these modes or with both modes. If implemented with both modes, the detection system may be configured to operate in one of these modes. The reverse order detection system includes an identify blackness in GOP component 311, an identify blackness of frame component 312, an identify blackness of I-frame component 313, and an identify blackness of B-frame component 314. The identify blackness in GOP component selects the frames in reverse order of dependency and invokes the identify blackness of frame component to determine the blackness of each frame. The forward order detection system includes an identify blackness in GOP component 321, an identify blackness of frame component 322, and an identify blackness of block component 323. The identify blackness in GOP component selects the frames in forward order of dependency and invokes the identify blackness of frame component to determine the blackness of the frames. The "R" or "F" before each component name indicates whether it is a component of the reverse order mode or the forward order mode.

The computing device on which the detection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the detection system. In addition, data structures and message structures may be stored or transmitted via a data transmission medium, such as a signal on a communications link. Various communications links may be used, such as the Internet, a local area network, a wide area network, or a point-to-point dial-up connection.

The detection system may be implemented in various operating environments including personal computers, server computers, hand-held or laptop devices, set-top boxes, recording devices, routers, switches, multiprocessor systems, microprocessor-based systems, programmable consumer electronics, network PCs, minicomputers, mainframe computers, distributed computing environments that include any of the above systems or devices, and the like. The detection system may also be implemented in hardware such as in an application-specific integrated circuit ("ASIC").

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
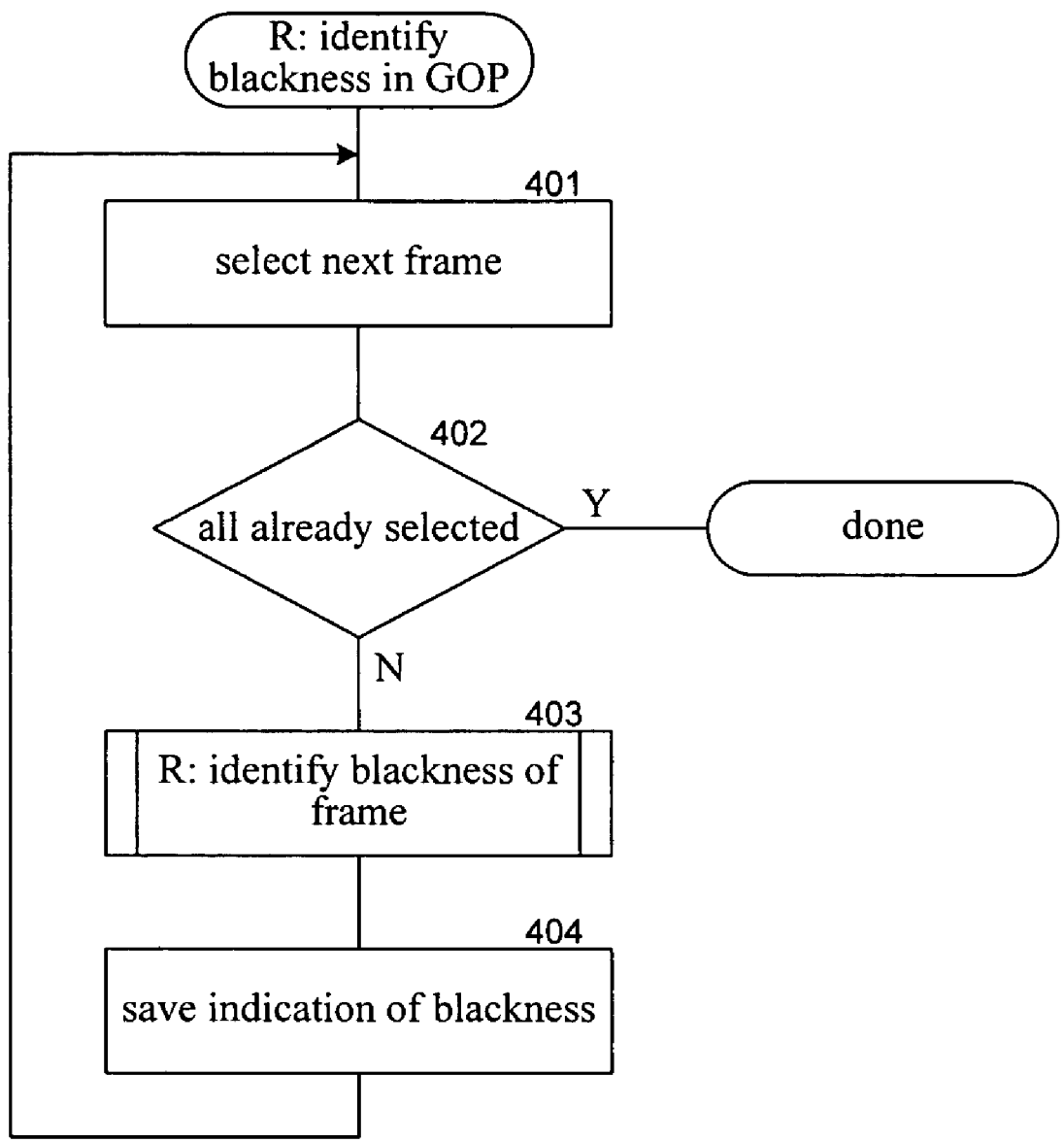
FIG. 4 is a flow diagram that illustrates the processing of the identify blackness in GOP component of the reverse order mode in one embodiment.

FIGS. 4-7 are flow diagrams that illustrate the processing of the detection system in reverse order of dependency mode in one embodiment. FIG. 4 is a flow diagram that illustrates the processing of the identify blackness in GOP component of the reverse order mode in one embodiment. The component is passed a GOP data structure and loops processing each frame in reverse order of dependency. In block 401, the component selects the next frame in reverse order of dependency. In decision block 402, if all the frames have already been selected, then the component completes, else the component continues at block 403. In block 403, the component invokes the identify blackness of frame component of the reverse order mode to determine the blackness of the selected frame. In block 404, the component saves the returned indication of blackness of the selected frame and then loops to block 401 to select the next frame.

Figure 5:
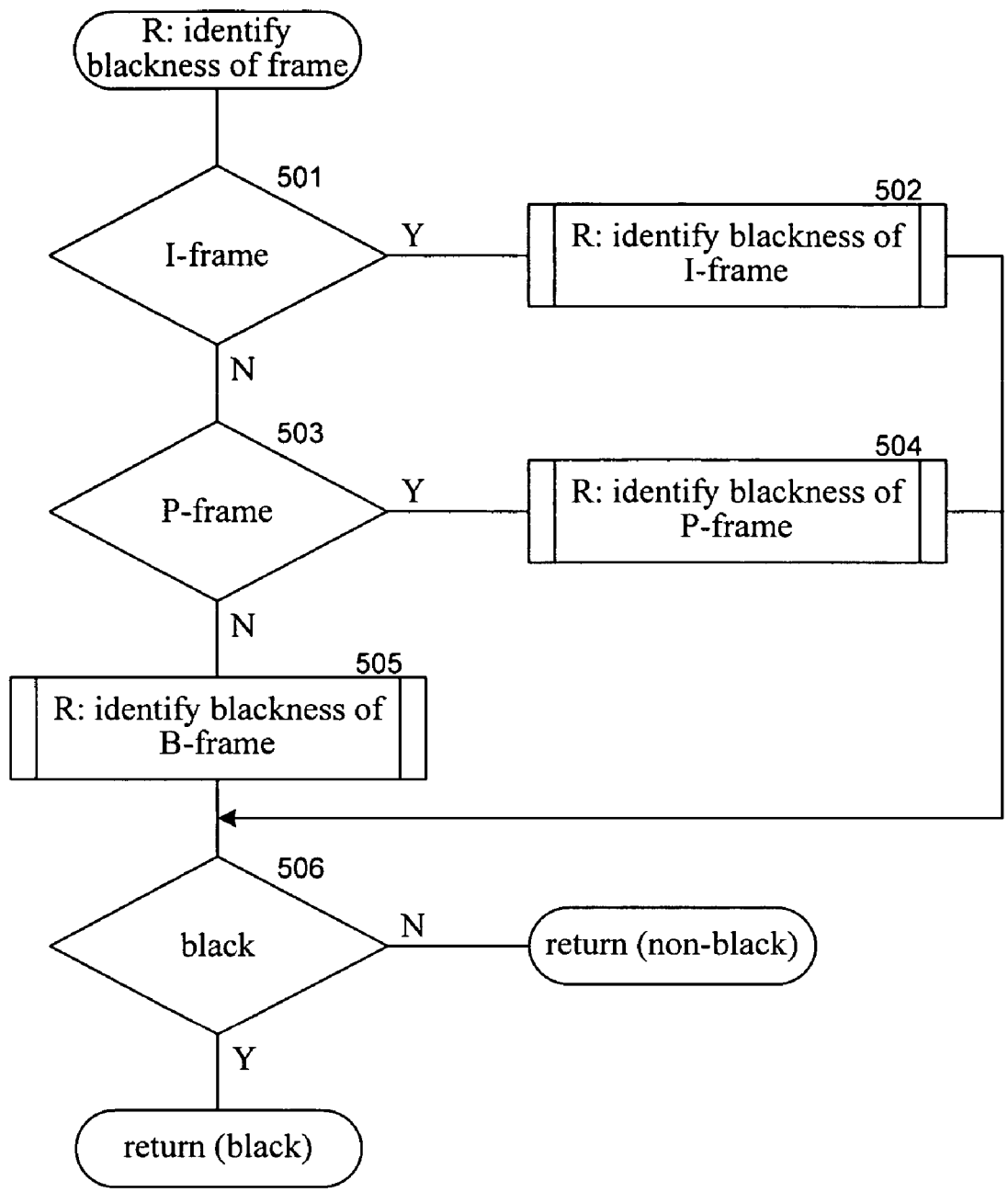
FIG. 5 is a flow diagram that illustrates the processing of the identify blackness of frame component of the reverse order mode in one embodiment.

FIG. 5 is a flow diagram that illustrates the processing of the identify blackness of frame component of the reverse order mode in one embodiment. The component processes the passed frame according to its frame type. In decision block 501, if the passed frame is an I-frame, then the component continues at block 502, else the component continues at block 503. In block 502, the component invokes the identify blackness of I-frame component of the reverse order mode and then continues at block 506. In decision block 503, if the passed frame is a P-frame, then the component continues at block 504, else the component continues at block 505. In block 504, the component invokes the identify blackness of P-frame component of the reverse order mode and then continues at block 506. In block 505, the component invokes the identify blackness of B-frame component of the reverse order mode. In decision block 506, if the passed frame is determined to be black, then the component returns an indication that the passed frame is black, else the component returns an indication that the passed frame is non-black.

Figure 6:
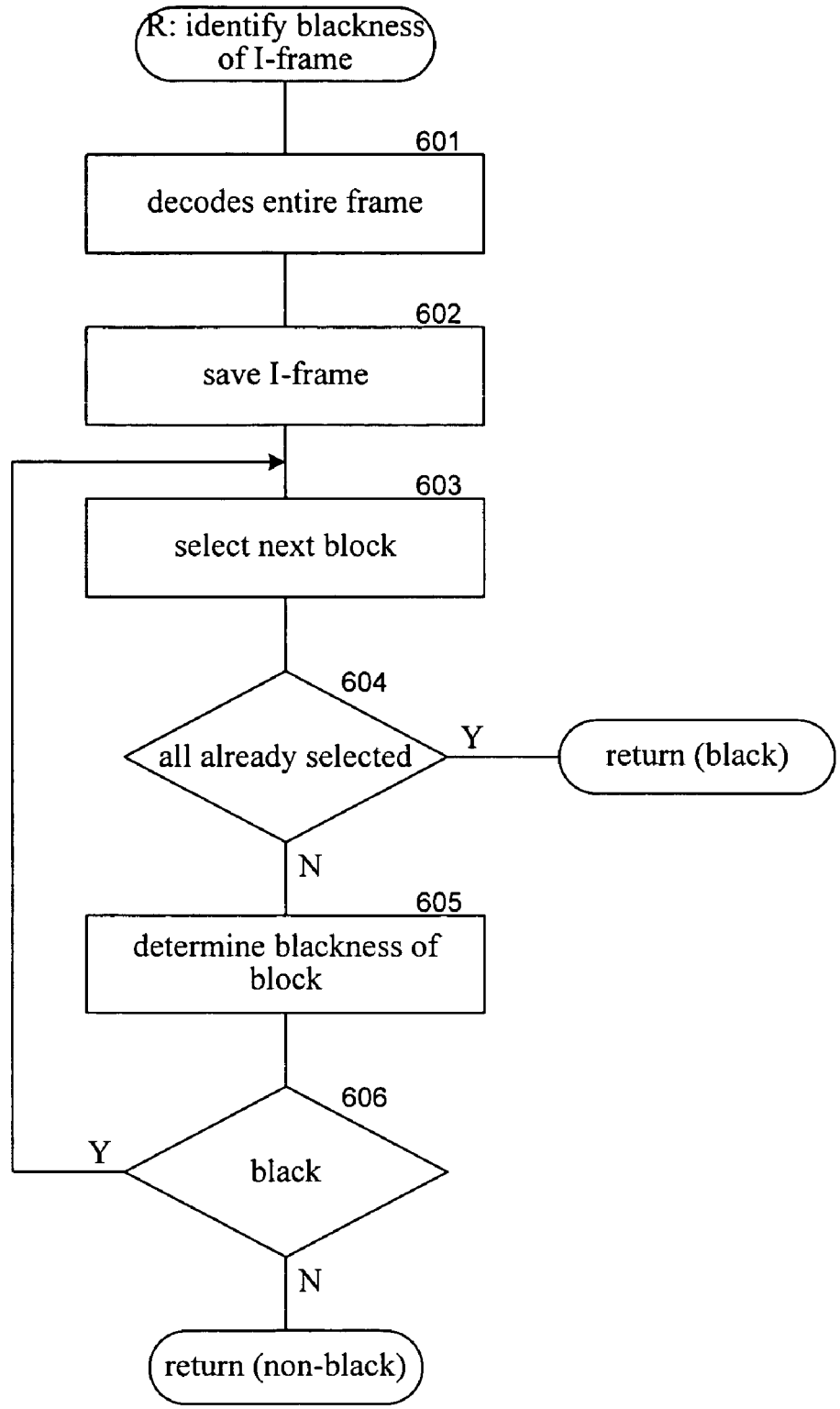
FIG. 6 is a flow diagram that illustrates the processing of the identify blackness of I-frame component of the reverse order mode in one embodiment.

FIG. 6 is a flow diagram that illustrates the processing of the identify blackness of I-frame component of the reverse order mode in one embodiment. Although not shown in a separate flow diagram, the detection system also includes a similar component for identifying the blackness of a P-frame. The component is passed an I-frame, decodes the I-frame, and then determines the blackness of the blocks of the frame until a non-black block is identified. In block 601, the component decodes the blocks of the frame using conventional techniques. In block 602, the component saves the decoded I-frame for use in decoding blocks of dependent frames. In blocks 603-606, the component loops processing each block until a non-black block is identified. In block 603, the component selects the next block of the passed I-frame. In decision block 604, if all the blocks have already been selected, then no block is non-black and the component returns an indication that the frame is black, else the component continues at block 605. In block 605, the component determines the blackness of the selected block. A block may be determined to be black when it has no pixel whose luminance exceeds a threshold value. In decision block 606, if the selected block is determined to be black, then the component loops to block 603 to select the next block, else the component returns an indication that the frame is non-black.

Figure 7:
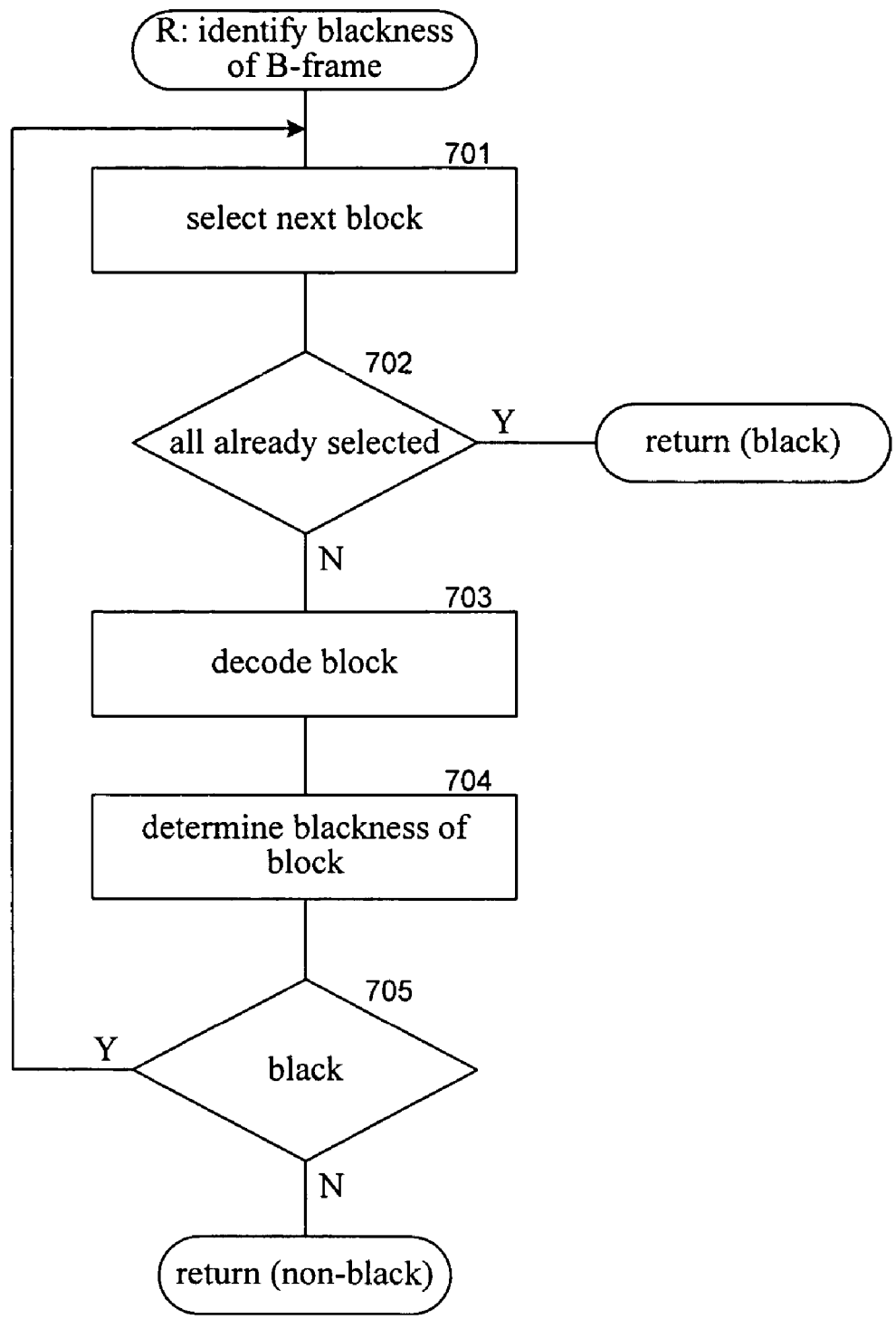
FIG. 7 is a flow diagram that illustrates the processing of the identify blackness of B-frame component of the reverse order mode in one embodiment.

FIG. 7 is a flow diagram that illustrates the processing of the identify blackness of B-frame component of the reverse order mode in one embodiment. The component is passed a B-frame and decodes its blocks and determines their blackness until a non-black block is decoded. In block 701, the component selects the next block. Blocks may be selected in order from upper left to lower right. Alternatively, the blocks may be selected in an order that may more quickly identify any non-black block. For example, the blocks may be selected starting from the center of a frame and working out to the edges of the frame under the assumption that non-black pixels may more likely be in the center of a frame, which may be the primary focus of viewer attention. Also, the detection system may divide a frame into collections of blocks (e.g., 16 macroblocks arranged 4-by-4) and selecting a block from each collection before selecting the next block from a collection. In decision block 702, if all the blocks have already been selected, then the component returns an indication that the frame is black, else the component continues at block 703. In block 703, the component decodes the selected block. Since the frames are processed in reverse order of dependency, any block on which the selected block depends would have already been decoded. In block 704, the component determines the blackness of the selected block. In decision block 705, if the component determines that the selected block is black, then the component loops to block 701 to select the next block, else the component returns an indication that the frame is non-black.

Figure 8:
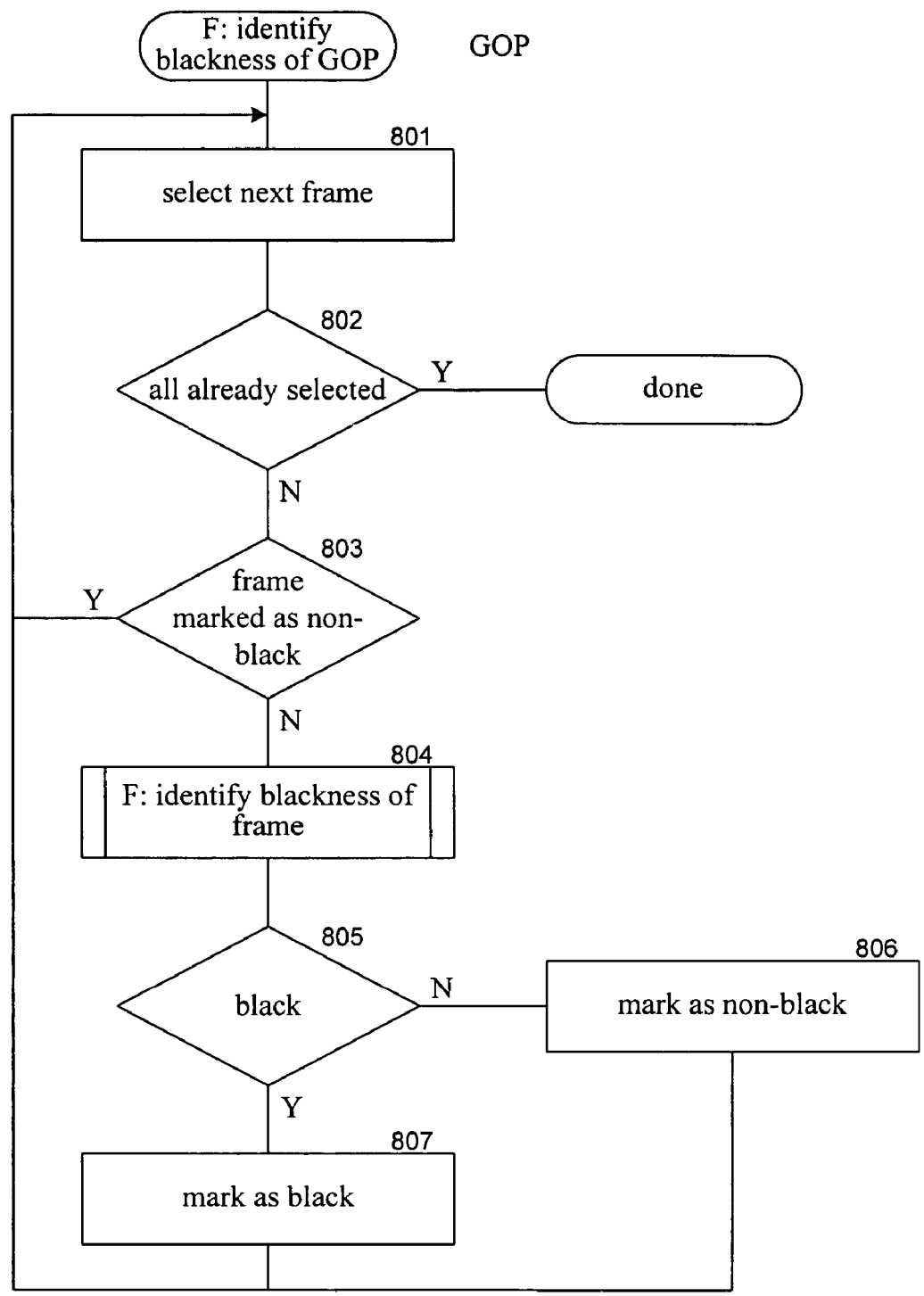
FIG. 8 is a flow diagram that illustrates the processing of the identify blackness of GOP component of the forward order mode in one embodiment.
Figure 9:
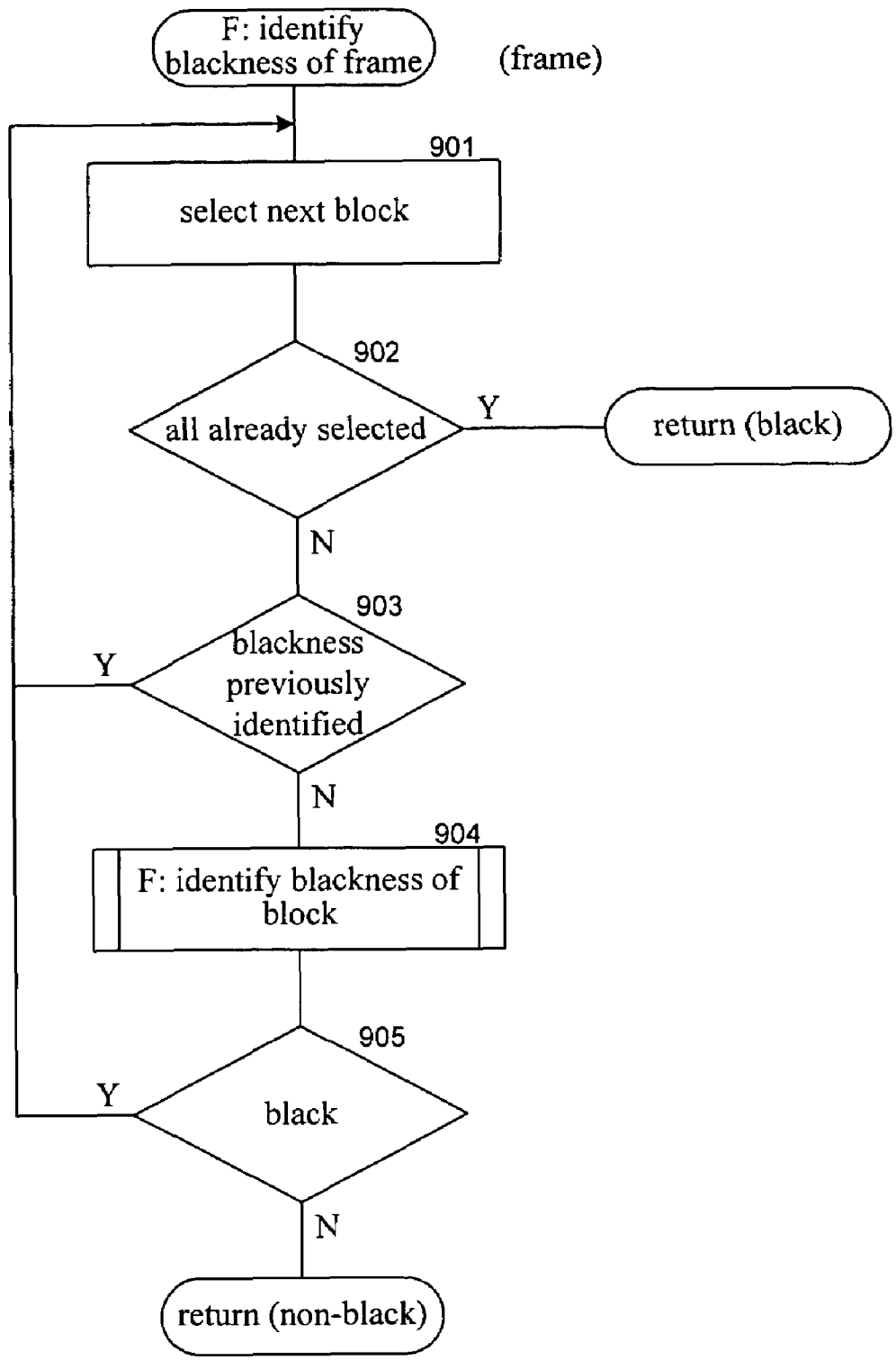
FIG. 9 is a flow diagram that illustrates the processing of the identify blackness of frame component of the forward order mode in one embodiment.
Figure 10:
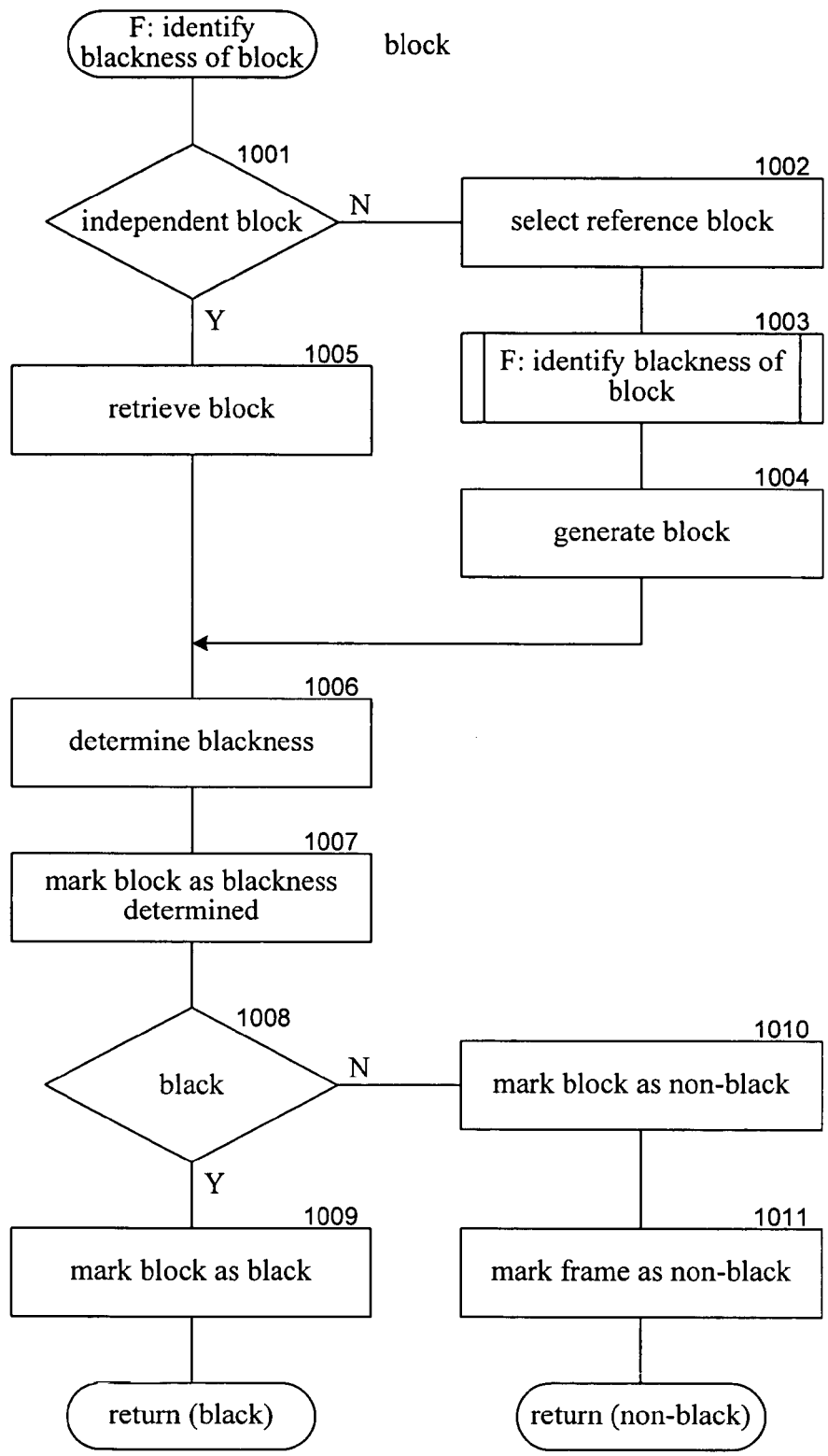
FIG. 10 is a flow diagram that illustrates the processing of the identify blackness of block component of the forward order mode in one embodiment.

FIGS. 8-10 are flow diagrams that illustrate the processing of the components of the detection system in the forward order of dependency mode in one embodiment. FIG. 8 is a flow diagram that illustrates the processing of the identify blackness of GOP component of the forward order mode in one embodiment. The component is passed a GOP data structure and loops selecting each frame in order of dependency. In block 801, the component selects the frame in order of dependency. In decision block 802, if all the frames have already been selected, then the component completes, else the component continues at block 803. In decision block 803, if the selected frame is already marked as non-black, then the frame was marked while processing a chain of dependencies and the component loops to block 801 to select the next frame, else the component continues at block 804. In block 804, the component invokes the identify blackness of frame component of the forward order mode to identify the blackness of the selected frame. In decision block 805, if the selected frame is black, then the component continues at block 807, else the component continues at block 806. In block 807, the component marks the selected frame as black and then loops to block 801 to select the next frame. In block 806, the component marks the selected frame as non-black and loops to block 801 to select the next frame.

FIG. 9 is a flow diagram that illustrates the processing of the identify blackness of frame component of the forward order mode in one embodiment. The component loops selecting the blocks of the passed frame until the blackness of the frame can be determined. In block 901, the component selects the next block of the passed frame. In decision block 902, if all the blocks of the passed frame have already been selected, then no blocks are non-black and the component returns an indication that the passed frame is black, else the component continues at block 903. In decision block 903, if the blackness of the selected block has already been determined when processing a chain of dependency, then it was determined to be black (otherwise the frame would have been marked as non-black) and the component loops to block 901 to select the next block, else the component continues at block 904. In block 904, the component invokes the identify blackness of block component to decode the selected block and determine its blackness. In decision block 905, if the selected block is black, then the component loops to block 901 to select the next block, else the component returns an indication that the frame is non-black.

FIG. 10 is a flow diagram that illustrates the processing of the identify blackness of block component of the forward order mode in one embodiment. The component is passed a block, decodes the block by following the chain of dependency as appropriate, and determines the blackness of the decoded block. The component is illustrated as being invoked recursively. One skilled in the art will appreciate that the principles of the detection system may also be implemented non-recursively. In decision block 1001, if the passed block is an independent block, then the component is at the end of a chain of dependency (if any) and continues at block 1005, else the component continues at block 1002. In block 1002, the component selects the block referenced by the dependency. In block 1003, the component recursively invokes the identify blackness of block component to decode and determine the blackness of the selected block to effect the following of the chain of dependency. In block 1004, the component decodes the block based on the decoded referenced block. In block 1005, the component decodes the block by retrieving the independent block. In block 1006, the component determines the blackness of the block. In block 1007, the component marks the passed block as having its blackness determined. In decision block 1008, if the passed block is black, then the component continues at block 1009, else the component continues at block 1010. In block 1009, the component marks the passed block as black and returns an indication of black. In block 1010, the component marks the passed block as non-black. In block 1011, the component marks the frame that contains the passed block as non-black and returns an indication of non-black.

One skilled in the art will appreciate that although specific embodiments of the detection system have been described herein for purposes of illustration, various modifications may be made without deviating from the spirit and scope of the invention. Accordingly, the invention is not limited except by the appended claims.

We claim:

1. A method performed by a device for identifying black frames within a sequence of frames, each frame having blocks, the method comprising:
  receiving by the device the sequence of frames that includes base frames and non-base frames, a non-base frame being dependent on a decoding of a block of a base frame;
  decoding by the device the blocks of base frames of the received sequence of frames;
  for each of the base frames,
    determining whether each of the decoded blocks of the base frame is black or not black;

when a decoded block of the base frame is determined to be non-black, indicating that the base frame is non-black; and when no decoded block of the base frame is determined to be non-black, indicating that the base frame is black; and for each of the non-base frames of the received sequence of frames, for blocks of the non-base frame, decoding by the device the block of the non-base frame;

determining whether the decoded block of the non-base frame is black or not black; and when the decoded block of the non-base frame is determined to be non-black, indicating that the non-base frame is non-black and suppressing the decoding of other blocks of the non-base frame; and when no decoded block of the non-base frame is determined to be non-black, indicating that the non-base frame is black.

2. The method of claim 1 wherein when a base frame is indicated to be non-black, suppressing the determining of whether other blocks of that base frame are black or not black.

3. The method of claim 1, wherein the base frames and the non-base frames are encoded using an MPEG-2 encoding.

4. The method of claim 3 wherein the base frames are I-frames and P-frames and the non-base frames are B-frames.

5. The method of claim 4 wherein I-frames are processed followed by dependent P-frames followed by dependent B-frames.

6. The method of claim 3 wherein the blocks are macroblocks.

7. A computer-readable storage medium containing instructions for controlling a device to identify blackness of frames within a sequence of frames, by a method comprising:

receiving the sequence of frames of blocks that includes base frames and non-base frames, a non-base frame being dependent on a decoding of a block of a base frame;

determining whether the base frames are black based on determining whether blocks of the base frames are black based on a decoding of the blocks of the base frames; and for the non-base frames, decoding the blocks of the non-base frame until a block indicating that the non-base frame is non-black is decoded so that a non-base frame can be indicated as non-black without having to decode all of its blocks.

8. The computer-readable storage medium of claim 7 including:

decoding all the blocks of each base frame; and determining whether blocks of a base frame are black until it is determined that a block is not black indicating that the base frame is non-black.

9. The computer-readable storage medium of claim 7 wherein a base frame is a frame on which the decoding of another frame is dependent.

10. The computer-readable storage medium of claim 7 wherein when a base frame is indicated to be non-black, suppressing the determining of whether other blocks of that base frame are black or not black.

11. The computer-readable storage medium of claim 7 wherein the base frames are I-frames and P-frames and the non-base frames are B-frames.

12. The computer-readable storage medium of claim 11 wherein I-frames are processed followed by dependent P-frames followed by dependent B-frames.

13. The computer-readable storage medium of claim 7 wherein the blocks are macroblocks.

14. A method performed by a device for determining blackness of frames within a sequence of frames, each frame having blocks, the method comprising:

receiving by the device the sequence of frames that includes frames that are dependent on a decoding of a base block of another frame;

for frames in order of dependency starting with frames that are dependent on a decoding of a base block of another frame, for blocks of the frame, decoding by the device the block by decoding blocks on which the block depends, if any;

determining by the device whether the decoded block is black or not black; and when the decoded block is determined to be non-black, indicating by the device that the frame is non-black and suppressing the decoding of other blocks of the frame, so that the blocks of a frame and their base blocks are only decoded until it can be determined whether the frame is black or not black.

15. The method of claim 14 wherein the decoding of the block by decoding blocks on which the block depends includes determining whether those blocks are black or not black and indicating that their frame is non-black when the block is determined to be non-black.

16. The method of claim 15 including skipping over frames that have been determined to be black or not black when decoding blocks of dependent frames.

17. The method of claim 15 including skipping blocks of a frame that has already been determined to be black or not black when decoding a dependent block.

18. The method of claim 14 wherein in the order of dependency non-base frames are ordered before base frames on which they depend.

19. The method of claim 14, wherein the base frames and the non-base frames are encoded using an MPEG-2 encoding.

20. The method of claim 19 wherein in the order of dependency the frames are I-frames, P-frames, and B-frames and the B-frames are ordered before the P-frames and I-frames on which they depend and the P-frames are ordered before the I-frames and other P-frames on which they depend.

21. The method of claim 20 wherein the blocks are macroblocks.

22. A computer-readable storage medium containing instructions for controlling a device to determine blackness of frames within a sequence of frames, each frame having blocks, by a method comprising:

selecting the frames of the sequence such that frames that are dependent on other frames are selected before frames on which they depend; and for blocks of the frames in order of selection, decoding the block by decoding blocks on which the block depends, if any;

determining whether the decoded block is black or non-black; and when the decoded block is determined to be non-black, indicating that the frame is non-black and suppressing the decoding of other blocks of the frame.

23. The computer-readable storage medium of claim 22 wherein the decoding of the block by decoding blocks on which the block depends includes determining whether those blocks on which the block depends are black or non-black and indicating that their frame is non-black when the block is determined to be non-black so that when the frame is selected it can be determined to be black or not black without processing blocks of the frame.

24. The computer-readable storage medium of claim 22 including skipping the decoding of blocks of a selected frame that have already been determined to be black or non-black when decoding a dependent block.

25. The computer-readable storage medium of claim 22 wherein in an order of dependency non-base frames are ordered before base frames on which they depend.

26. The computer-readable storage medium of claim 22, wherein the base frames and the non-base frames are encoded using an MPEG-2 encoding.

27. The computer-readable storage medium of claim 26 wherein in an order of dependency the frames are I-frames, P-frames, and B-frames and the B-frames are ordered before the P-frames and I-frames on which they depend and the P-frames are ordered before the I-frames and other P-frames on which they depend.

28. The computer-readable storage medium of claim 27 wherein the blocks are macroblocks.

29. A device for detecting black frames of a sequence of frames without fully decoding every frame of the sequence, comprising:

a component of the device that receives the sequence of frames of blocks that include a group of pictures ("GOP") data structure having a beginning I-frame, an ending B-frame, and intermediate P-frames and B-frames, the frames having an order of dependency of B-frames followed by P-frames followed by the I-frame, the blocks being independent blocks and dependent blocks, an independent block having a decoding that is not dependent on the decoding of another block, a dependent block having a decoding that is dependent on the decoding of another block; and a component of the device that identifies whether each frame of the sequence is a black frame or a non-black frame by selecting the frames in the order of dependency, when the selected frame has not already been designated as being non-black, selecting blocks of the selected frame until a selected block is determined to be non-black or until all blocks have already been selected, when the selected block is an independent block, decoding the selected block and when the decoded block is non-black, designating the selected frame as being non-black; and when the selected block is a dependent block, decoding the selected block by decoding the block on which the selected block depends and when the decoded block is non-black, designating the selected frame as being non-black and designating the frame that contains the block on which the selected block depends as being non-black; and when no block of the selected frame is determined to be non-black, designating the selected frame as being black.

* * * * *

UNITED STATES PATENT AND TRADEMARK OFFICE
CERTIFICATE OF CORRECTION

PATENT NO.       : 7,650,031 B2                                            Page 1 of 1
APPLICATION NO.  : 10/997071
DATED            : January 19, 2010
INVENTOR(S)      : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1332 days.

Signed and Sealed this

Twenty-eighth Day of December, 2010

David J. Kappos
*Director of the United States Patent and Trademark Office*